Dec. 3, 1963 J. DOLZA Re. 25,492
CHARGE FORMING MEANS
Original Filed June 5, 1957
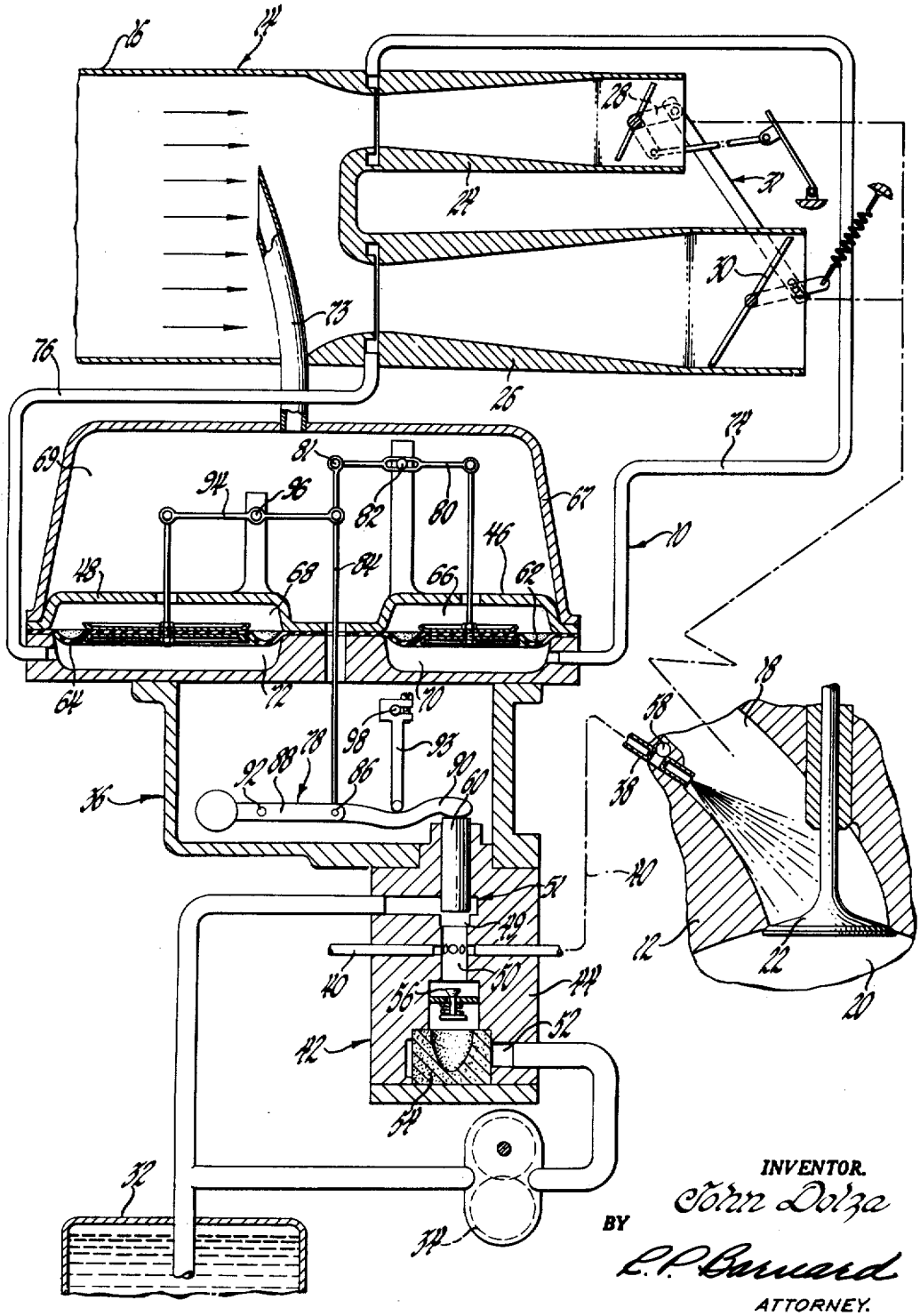
INVENTOR.
John Dolza
BY
L. P. Barnard
ATTORNEY.

United States Patent Office

Re. 25,492
Reissued Dec. 3, 1963

25,492

CHARGE FORMING MEANS

John Dolza, Fenton, Mich., assignor to General Motors Corporation, Detroit, Mich., a corporation of Delaware Original No. 2,874,944, dated Feb. 24, 1959, Ser. No. 663,647, June 5, 1957. Application for reissue Jan. 10, 1961, Ser. No. 81,905
17 Claims. (Cl. 123—119)

Matter enclosed in heavy brackets [ ] appears in the original patent but forms no part of this reissue specification; matter printed in italics indicates the additions made by reissue.

The present invention relates to internal combustion engines and more particularly to the charge forming means therefor.

In the operation of an internal combustion engine of the so-called spark ignited variety the combustible charge of air and fuel may be formed in the induction system and then introduced into the engine cylinders where it is burned. One means for accomplishing this is to provide an air induction system for supplying the air to the cylinders and a fuel injection system for injecting metered quantities of fuel into the charge. The injection system may include a fuel metering valve that is actuated in response to the fuel demands of the engine. For example, this valve may be operatively interconnected with a diaphragm responsive to a vacuum signal developed in the throat of a venturi located in the air induction system. In order to insure an accurate metering action the venturi must have a sufficient restriction to insure the development of a vacuum signal of adequate strength and accuracy even during the small air flows occurring during light load operation. If the engine operates over a very wide range of loads such as an automotive engine, if the venturi presents a sufficient restriction to develop a satisfactory signal during idle operation, during heavy load operation it will restrict the volume of air entering the engine, thereby limiting the volumetric efficiency of the engine and therefore its maximum power.

It is now proposed to provide a fuel injection system having means for developing a signal of adequate strength even at light loads without materially limiting the volumetric efficiency of the induction system. More particularly, this is to be accomplished by providing a plurality of venturis in the induction system which are arranged to become operative in sequence. Thus a small venturi may be provided for use during the light load range and a large venturi may be provided for use in the heavy load range. The throat of each venturi is interconnected with a separate diaphragm each of which is, in turn, interconnected with the fuel metering valve by a common linkage system effective to transmit the force from each diaphragm to the metering valve. Thus, irrespective of the manner in which the air flow divides between the venturis, the resultant force on the metering valve will always be a function of the total amount of air flow and the fuel will thus always be accurately metered.

In the one sheet of drawings:

The FIGURE is a diagrammatic view of a fuel injection system embodying the present invention.

Referring to the drawings in more detail, the present invention may be incorporated into a fuel injection system 10 for use on any suitable multicylinder internal combustion engine 12. In the present instance the system 10 is employed on a so-called spark ignited engine 12 having an induction system 14 that includes an atmospheric air intake 16 and a plurality of induction passages 18 that are interconnected with the intake 16 by a suitable manifold (not shown) and terminate in the combustion chambers

20 for supplying the charge thereto. The air flow into the cylinders is controlled by the intake valves 22.

The intake 16 includes at least two venturis 24 and 26 through which the induction air flows. The primary venturi 24 is particularly designed to produce an accurate metering signal during the low speed while the secondary venturi 26 is arranged to supply additional air during heavy loads with a minimum flow resistance. The flow of air through each venturi 24 and 26 is regulated by a primary throttle 28 and a secondary throttle 30. These throttles 28 and 30 are manually actuated by a linkage 31 that will cause only the primary throttle 28 to open during light loads but will permit both throttles to open at full loads.

The fuel system 10 includes a fuel storage tank 32, fuel pumping means 34 for circulating the fuel through the system 10, a metering mechanism 36 for maintaining the fuel flow in the desired proportions to the air flow, and a plurality of nozzles 38 located in the induction passages 18 adjacent the intake valves 22 and interconnected with metering mechanism 36 by injector lines 40 for discharging the atomized metered fuel directly into the air as it flows to the cylinders. The pumping means 34 may be of any desired design that is capable of delivering a surplus of fuel at a pressure in excess of that required to operate the system 10.

The metering mechanism 36 includes a housing 42 having a fuel distributor and regulator 44 in the bottom thereof and a pair of diaphragm chambers 46 and 48 in the top thereof. The fuel distributor and regulator 44 includes an outlet 49 with a flow control valve 51 therein, a distributor chamber 50 and an inlet 52 which may be connected to the pump means. The identical injector lines 40 may radiate outwardly from the center of the distributor chamber with the outer ends thereof including nozzles located in the induction passages and aimed to direct a stream of fuel toward the intake valves. The inlet 52 is connected to the bottom of the vertical distribution chamber 50 so that the fuel from the inlet 52 will flow vertically upwardly through the distribution chamber 50 and leave through the outlet 49 or the injector lines 40. It has been found desirable to provide a strainer or filter element 54 in the inlet 52 for removing any impurities that might otherwise impair the operation of the system 10, and also to provide a pressure relief valve 56 to maintain the fuel pressure anterior thereto in excess of some predetermined amount.

In order to obtain a uniform distribution of the fuel to all of the cylinders, it is desirable that the hydraulic resistances of the nozzles 38 be considerably larger than that of the injector lines 40. Thus the primary factor controlling the quantity of fuel flow will be the nozzles 38 and any minor irregularities in the injector lines 40 will have little or no effect on the metering and distribution of fuel to the cylinders. These nozzles 38 are preferably similar to those disclosed in copending application Serial No. 608,893 Dolza, first filed September 10, 1956, *now Patent No. 2,860,859*, wherein the fuel is discharged through a small orifice disposed in an envelope of air at substantially atmospheric pressure provided by vent 58. The orifice is aimed to direct a stream of fuel through a second opening and into the induction system toward the intake valves 22. It may thus be seen that the fuel system 10 will be substantially isolated from the effects of intake vacuum. The resistances of the small orifices and the injector lines will present a resistance to the flow of fuel that will cause a pressure in the distributor chamber 50 that will be indicative of the amount of metered fuel injected into the charge.

A piston type fuel control valve 51 may be disposed in the outlet 49 at the top of the distributor chamber 50 for regulating the amount of spill fuel bypassed from the distributor chamber 50 and returned to the fuel storage tank 32. It will be seen that since the valve 51 controls the amount of spill fuel, it will also regulate or meter the amount of fuel flow through the nozzles 33. In the present instance this valve 51 comprises a piston 60 slidably disposed in a vertical bore with the lower end thereof reciprocating into and out of outlet opening 49. Thus this axial movement will vary the effective area of the opening and thereby regulate the fuel flow. Since the cross-sectional area of the piston 60 will be exposed to the pressure of the fuel in the distributor chamber 50 which is a function of the amount of metered fuel flowing through the nozzles, the resultant upward force on the piston 60 tending to lift it out of the oulet 49 will also be indicative of the amount of metered fuel.

Each of the diaphragm chambers 46 and 48 includes a flexible diaphragm 62 or 64 that extends horizontally thereacross to divide each chamber 46 and 48 into an upper compartment 66 and 68 and a lower compartment 70 and 72. Although the upper compartments 66, 68 may be vented directly to atmosphere, it is preferable that a housing 67 be formed over the linkage 78 and that the interior 69 of the housing 67 be interconnected with the intake 16 anterior to the venturis 24, 26 by a tube 71. The lower compartment 70 is preferably connected to the throat of the primary venturi 24 by a primary signal line 74 an dthe lower compartment 72 is connected to the throat of the secondary venturi 26 by a secondary signal line 76. It may thus be seen that as the air flows through the primary venturi 24 and a vacuum develops in the throat, the diaphragm 62 will have a force thereon indicative of the quantity of air flowing through that venturi 24 and that when the air is also flowing through the secondary venturi 26, the vacuum in the secondary throat will create a force on the secondary diaphragm 64 indicative of the quantity of air flowing through the secondary venturi 26. The primary diaphragm 62 may be connected to the control valve 51 by a linkage 78 that will transfer the force on the diaphragm to the piston 60. Although this linkage 78 may be of any suitable form in the present instance it includes a lever 80 that has a fulcrum 82 in the middle and a vertical link 84 on the end 81 that is connected to the joint 86 between a counterweight lever 88 and a control lever 90. The counterweight lever 88 may pivot about a fixed pin 92 and have a weight on the end thereof that will tend to balance the weight of the various portions of the linkage system. The center of the control lever 90 pivots about the lower end of an adjustable ratio arm 93 while the end thereof bears on the piston 60. Thus it will be seen that the difference in air pressure on the diaphragm 62 will produce a downward force on the piston 60 that will bias it closed in opposition to the opening force of the fuel pressure in the distributor chamber 50. The secondary diaphragm 64 is also interconnected with the piston valve 60 by means of a second lever 94 that pivots on its own fulcrum 96 and has one end connected to the vertical link 84. Thus any air flowing through the secondary venturi 26 will also impose an additional force on the piston valve 60 that will tend to close in proportion to the secondary air flow.

As previously stated the position of the piston 60 in the outlet 49 regulates the volume of bypassed fuel and thereby controls or meters the amount of fuel distributed to the various cylinders. The fuel pressure inside of the distributor chamber 50 will exert an upward force on the bottom of the piston 60 which will tend to raise the same thereby increasing the amount of fuel bypassed and decreasing the flow of metered fuel. However, the forces produced by the air flows through the primary and secondary venturis 24 and 26, will tend to force the piston 60 downwardly into the outlet and increase the supply of the fuel to the cylinders. Thus it may be seen that the air flow and fuel flow will produce forces opposing each other and cause movement of the piston 60 until the two forces are balanced. When these two forces are balanced the air and fuel will be flowing in some predetermined ratio. The proportions of this ratio will be determined by the areas of the diaphragms 62 and 64, the area of the piston 60 exposed to the fuel pressure, and the mechanical advantages of the linkage and levers, etc. Preferably, the diaphragms 62 and 64, venturis 24 and 26 and levers 80 and 94 are proportional so that a given unit of air flow will produce the same force on the piston 60 irrespective of whether it flows through the primary or secondary venturi 24 or 26.

It can be appreciated that by rocking the ratio arm 93 about the shaft 98, the mechanical advantage of the linkage can be varied so that the amount of the force transferred from the diaphragms 62 and 64 to the piston 60 can be readily adjusted. This will, in turn, permit a convenient means of adjusting the air-fuel ratio. However, it is, of course, apparent that there are numerous other means that may be used with or in place thereof for regulating the air-fuel ratio in any desired manner.

It may therefore be seen that a simple and economical fuel injection system has been provided which is particularly adapted for supplying fuel to an internal combustion engine operating over a wide range of loads. This system will insure an accurate metering action during light loads and at the same time will not restrict the volumetric efficiency during heavy loads.

It is to be understood that, although the invention has been described with specific reference to a particular embodiment thereof, it is not to be so limited since changes and alterations therein may be made which are within the full intended scope of this invention as defined by the appended claims.

The claims:

1. Charge forming means for an internal combustion engine comprising a fuel valve adapted to meter the fuel flow, a plurality of induction inlets adapted to draw induction air from the atmospher a metering means in each of said inlets for creating a pressure differential indicative of the air flow therethrough and separate means responsive to each of said differentials for actuating said valve in response thereto.

2. Charge forming means for an internal combustion engine comprising a bypass valve for metering the fuel flow and being responsive to an opening force proportional to said flow, an induction inlet having a pair of parallel venturis with throats therein, a pressure sensitive means responsive to the pressure in the throat of each venturi for imposing separate closing forces on said valve in opposition to said fuel force.

3. Charge forming means for an internal combustion engine comprising a bypass valve adapted to meter fuel by passing the surplus fuel, said valve being responsive to a fuel pressure tending to open said valve with a force indicative of the amount of metered fuel, an induction inlet having a primary venturi and a secondary venturi, means responsive to the air flow through said primary venturi for imposing a primary closing force on said valve indicative of said flow and means responsive to the air flow through said secondary venturi for imposing a secondary closing force on said valve indicative of said secondary flow.

4. Charge forming means for an internal combustion engine comprising a bypass valve adapted to meter fuel by bypassing the surplus fuel, said valve being responsive to a fuel pressure tending to open said valve with a force indicative of the amount of metered fuel, an induction inlet having a pair of parallel metering means therein, a throttle valve posterior to each of said means for separately controlling the flow of air therethrough, means responsive to the air flow through one of said first means for imposing a primary closing force on said fuel valve indicative of said flow and means responsive to the air flow through the other of said first means for imposing a secondary closing force on said fuel valve indicative of an air flow therethrough.

5. Charge forming means for an internal combustion engine comprising a bypass valve adapted to meter fuel by bypassing the surplus fuel, said valve being responsive to a fuel pressure tending to open said valve with a force indicative of the amount of metered fuel, an induction inlet having a primary venturi and a secondary venturi, separate throttle valves in each of said venturis, means responsive to the air flow through said venturis for imposing a primary closing force on said bypass valve indicative of said air flows.

6. Charge forming means for an internal combustion engine comprising a bypass valve adapted to meter fuel by bypassing the surplus fuel, said valve being responsive to a fuel pressure tending to open said valve with a force indicative of the amount of metered fuel, an induction inlet having a primary venturi and a secondary venturi in parallel thereto, a first diaphragm responsive to the amount of air flow through said primary venturi for imposing a primary closing force on said fuel valve indicative of said air flow and a second diaphragm responsive to the air flow through said secondary venturi for imposing a secondary closing force on said fuel valve indicative of said secondary flow.

7. Charge forming means for an internal combustion engine comprising a distributing chamber adapted to receive fuel under pressure and distribute metered fuel to the cylinders of said engine, a bypass valve in said distributing chamber adapted to meter fuel by bypassing the surplus fuel therefrom, the fuel pressure in said chamber being indicative of the amount of metered fuel and tending to open said bypass valve with a force proportional thereto, an induction inlet having a pair of parallel metering restrictions therein, means responsive to the air flow through one of said restrictions for imposing a primary closing force on said bypass valve indicative of said air flow, means responsive to the air flow through the other of said restrictions for imposing a secondary closing force on said bypass valve indicative of said second air flow.

8. Charge forming means for an internal combustion engine comprising a distributing chamber adapted to receive fuel under pressure and distribute metered fuel to the cylinders of said engine, a bypass valve in said distributing chamber adapted to meter fuel by bypassing the surplus fuel therefrom, the fuel pressure in said chamber being indicative of the amount of metered fuel and tending to open said bypass valve with a force proportional thereto, an inlet having a primary venturi and a secondary venturi, means responsive to the air flow through said primary venturi for imposing a closing force on said valve indicative of said flow and means responsive to the air flow through said secondary venturi for imposing a secondary closing force on said bypass valve indicative of said secondary flow.

9. The combination of claim 5 wherein said last mentioned means include a pair of diaphragms each of which is responsive to the pressure differential in one of said venturis and is operatively interconnected with said valve by a control linkage.

10. Charge forming means for an internal combustion engine comprising a distributing chamber adapted to receive fuel under pressure and distribute metered fuel to the cylinders of said engine, a bypass valve in said distributing chamber adapted to meter fuel by bypassing the surplus fuel therefrom, the fuel pressure in said chamber being indicative of the amount of metered fuel and tending to open said bypass valve with a force proportional thereto, an induction system having an inlet with a primary venturi and a secondary venturi in parallel thereto, a first diaphragm responsive to the amount of air flow through said primary venturi operatively interconnected with said bypass valve by a linkage adapted to exert a closing force on said valve indicative of said air flow, a second diaphragm responsive to the amount of air flow through said secondary venturi operatively interconnected with said linkage for imposing a secondary closing force on said bypass valve indicative of said secondary air flow.

11. The combination of claim 10 including enrichment means adapted to modify the effectiveness of said forces to thereby control the air-fuel ratio.

12. The combination of claim 10 wherein said linkage includes a lever with an adjustable fulcrum for changing the mechanical advantage of said forces to thereby regulate the air-fuel ratio.

13. Charge forming means for a multicylinder internal combustion engine comprising an induction system for supplying air to said cylinders and including a plurality of atmospheric inlets, each of which includes means for creating a pressure differential indicative of the air flow therethrough, a fuel metering valve responsive to a force indicative of the amount of fuel flow and effective to meter the fuel flow to the cylinders, means responsive to said pressure differentials for imposing a force on said valve indicative of the air flow therethrough.

*14. A fuel metering system for an internal combustion engine comprising primary and secondary air intake conduits, air flow metering means in each said air conduit, fuel conduit means communicating with a fuel supply and said engine, and pressure responsive adjustable fuel metering means in said fuel conduit means adjustable to vary the flow of fuel therethrough, said fuel metering means being operatively connected to each said air flow metering means in each said air conduit and adjustable thereby in response to air flow through each said air conduit, said metering means in said secondary air intake conduit becoming active to adjust said fuel metering means upon a predetermined air flow in said primary air intake conduit.*

*15. A mass flow responsive fuel control system for an internal combustion engine comprising primary and secondary air intake conduits adapted to be operatively connected to said engine, air flow metering means in each of said conduits, constant delivery fuel feed means for supplying fuel to said engine, return flow means connected to said feed means to purge fuel vapors therefrom, pressure responsive adjustable fuel metering means in said return flow means for regulating the flow therethrough, said fuel metering means being operatively connected to each said air flow metering means and adjustable thereby to regulate the flow of fuel to the engine in linear proportion to the air flow thereto.*

*16. A mass flow responsive fuel control system for an internal combustion engine comprising primary and secondary air intake conduits adapted to be operatively connected to said engine, air flow metering means in each said conduit, constant delivery fuel feed means for supplying fuel to said engine, return flow means connected to said fuel feed means to purge fuel vapors therefrom, pressure responsive adjustable fuel metering means in said return flow means for regulating the flow therethrough, said fuel metering means comprising a shiftable member connected to two air pressure responsive diaphragm devices, said diaphragm devices being connected to said air flow metering means in said air intake conduits and responsive to air flow through said air intake conduits to adjust said fuel metering means to regulate the flow of fuel to the engine in linear proportion to the air flow thereto.*

*17. A fuel metering unit for an internal combustion engine comprising a primary and a secondary air conduit for supplying air to said engine, a venturi tube in each said air conduit for measuring air flow therethrough, a constant delivery fuel supply, a fuel feed conduit connecting said fuel supply to said engine, a primary fuel jet in said fuel feed conduit, a return flow conduit connected to said fuel feed conduit at a point intermediate said fuel*

*supply and said jet and communicating with said fuel supply, adjustable valve means in said return flow conduit for regulating the fuel flow therethrough, air pressure responsive means connected to said adjustable valve means for adjusting same, said air pressure responsive means being connected to said venturi tube in each said air conduit for receiving air flow signals therefrom and being responsive to said signals to adjust said valve means according to air flow through said air conduits.*

References Cited in the file of this patent or the original patent

UNITED STATES PATENTS

| | | |
|---|---|---|
| 2,382,625 | Garretson | Aug. 14, 1945 |
| 2,488,250 | Williams | Nov. 15, 1949 |
| 2,507,075 | Wiegand et al. | May 9, 1950 |